(12) United States Patent
Matsui et al.

(10) Patent No.: US 8,362,648 B2
(45) Date of Patent: Jan. 29, 2013

(54) ELECTRIC POWER SUPPLY SYSTEM

(75) Inventors: Ryoji Matsui, Osaka (JP); Kazuhito Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 262 days.

(21) Appl. No.: 12/745,997

(22) PCT Filed: Nov. 25, 2008

(86) PCT No.: PCT/JP2008/071322
§ 371 (c)(1),
(2), (4) Date: Jun. 3, 2010

(87) PCT Pub. No.: WO2009/072415
PCT Pub. Date: Jun. 11, 2009

(65) Prior Publication Data
US 2010/0253148 A1      Oct. 7, 2010

(30) Foreign Application Priority Data

Dec. 4, 2007   (JP) .................................. 2007-313816

(51) Int. Cl.
*H02J 1/00*   (2006.01)
*H02J 3/00*   (2006.01)
(52) U.S. Cl. .............................. 307/75; 363/37; 700/286
(58) Field of Classification Search .................. 307/75, 307/45, 46, 44, 80
See application file for complete search history.

(56) References Cited

U.S. PATENT DOCUMENTS

| | | | |
|---|---|---|---|
| 7,227,287 B2 * | 6/2007 | Noda et al. | 310/68 R |
| 7,449,798 B2 | 11/2008 | Suzuki et al. | |
| 2002/0071292 A1 * | 6/2002 | Aihara et al. | 363/20 |
| 2006/0023478 A1 * | 2/2006 | Takeda et al. | 363/97 |

FOREIGN PATENT DOCUMENTS

| | | |
|---|---|---|
| JP | 6-165395 | 6/1994 |
| JP | 06165395 | * 6/1994 |
| JP | 2000-224769 | 8/2000 |
| JP | 2003-204682 | 7/2003 |
| JP | 2006-254694 | 9/2006 |
| JP | 2007-124830 | 5/2007 |

OTHER PUBLICATIONS

International Search Report for PCT/JP2008/071322, mailed Feb. 10, 2009.

* cited by examiner

*Primary Examiner* — Rexford Barnie
*Assistant Examiner* — Toan Vu
(74) *Attorney, Agent, or Firm* — Nixon & Vanderhye, P.C.

(57) ABSTRACT

An electric power supply system is provided for feeding an output of a DC power source to a load at high efficiency and, without complicated controlling, for allowing for interchange of electric power among a commercial power system, a DC power source and a load.
An electric power supply system includes a DC bus line for connecting a DC generator, a load and system power. The electric power supply system comprises a DC/DC converter connected between the DC generator and the DC bus line for controlling an output voltage to the DC bus line at a voltage V1; an inverter connected between the system power and the DC bus line for operating a control in response to an input voltage V2 from the DC bus line; and an AC/DC converter connected between the system power and the DC bus line for controlling an output voltage to the DC bus line at a voltage V3, wherein the respective voltages are set as V1>V2>V3.

5 Claims, 7 Drawing Sheets

ELECTRIC POWER SUPPLY SYSTEM

This application is the U.S. national phase of International Application No. PCT/JP2008/071332 filed 25 Nov. 2008 which designated the U.S. and claims priority to JP Patent Application No. 2007-313816 filed 4 Dec. 2007, the entire contents of each of which are hereby incorporated by reference.

TECHNICAL FIELD

The present invention relates to an electric power supply system for feeding electric power to a load using a DC generator and system power, and also to an electric power supply system for feeding electric power to a load using a DC generator, a storage battery and system power.

BACKGROUND ART

A plenty of techniques for effectively operating an electric power supply system using a DC generator and system power have been developed.

For example, Patent Document 1 shows an electric power supply system for feeding electric power to a load through an electronic transformer commonly operated at operation efficiency of almost 100% by combining natural energy power and nighttime power. More particularly, the rated power voltage of a wind power generator, a photovoltaic generator and a fuel cell is coincident with the rated voltage of a storage battery to construct a DC power source. Until the storage battery is fully charged by the DC power source, AC power is supplied to the load from a commercial AC power source. When the storage battery is fully charged or the commercial AC power source is in a power failure, DC power is supplied from the DC power source and the storage battery. While the storage battery is discharging electric power, power energy is complemented from the fuel cell. During the time of the daylight power supply or the nighttime power supply, AC power is supplied to the load from the commercial AC power source.

Patent Document 2 also shows a construction that an output of a DC generator such as a fuel cell is connected to an DC output of a bidirectional DC-AC power inverter, to which connection a DC outlet is coupled through a DC power conversion device. AC system power and an AC load are coupled to an AC terminal of the bidirectional DC-AC power inverter.

Moreover, Patent Document 3 includes a DC power inverter for inverting DC voltage generated by a fuel cell generator, and an AC-DC power converter for converting AC power to DC power. A DC load and a DC output terminal of the AC-DC power converter are connected to an output terminal of the DC power inverter, and AC system power and an AC load are connected to an AC input terminal of the AC-DC power converter.

Patent Document 1: Japanese Unexamined Patent Application Publication No. 2006-254694
Patent Document 2: Japanese Unexamined Patent Application Publication No. 2003-204682
Patent Document 3: Japanese Unexamined Patent Application Publication No. 2007-124830

DISCLOSURE OP THE INVENTION

Problems to be Solved by the Invention

However, in the conventional art, an inverter, an AC/DC converter and a DC/DC converter must be controlled even in response to output variations of the DC generator, the load variations and the power failure of commercial AC power source (AC power system). A controller is required for this controlling, but the controller necessitates a timepiece and a sensor such as a volt meter in order to control the inverter, the AC/DC converter and the DC/DC converter, and moreover a system must be constructed so as to operate a control in response to the output of the timepiece and the sensor.

In order to solve the above problems, it is an object of the present invention to provide an electric power supply system for feeding an output of a DC power source to a load at high efficiency and, without complicated controlling, for allowing for interchange of electric power among an AC power system, a DC power source and a load, or among an AC power system, an AC power source, a load and a storage battery.

Means for Solving the Problems

In order to solve the above problems, an electric power supply system of the present invention includes a DC bus line for connecting a DC generator, a load and system power each other; a DC/DC converter connected between the DC generator and the DC bus line for controlling an output voltage to the DC bus line at a voltage $V1$; an inverter connected between the system power and the DC bus line for operating a control in response to an input voltage $V2$ from the DC bus line; and an AC/DC converter connected between the system power and the DC bus line for controlling an output voltage to the DC bus line at a voltage $V3$, in which the respective voltages are set as $V1>V2>V3$.

Further, a storage battery is provided which is connected to the DC bus line. When the full charge voltage of the storage battery is $V4$ and the empty voltage thereof is $V5$, the respective voltages are set as $V1>V2>V4>V3>V5$.

According to this construction, the voltage value of the DC bus line decides whether or not the DC generator or the system power can supply power to the DC bus line, or power from the DC bus line can be received by the system power. Further, the voltage value of the DC bus line decides whether or not the DC generator, the storage battery or the system power can supply power to the DC bus line, or the power from the DC bus line can be received by the system power.

When the respective voltages are set as $V1>V2>V4>V3>V5$, the order in which to be supplied to the DC bus line is automatically decided as follows. (1) When the voltage of the storage battery is higher than the output voltage of the AC/DC converter, the first is the DC generator, the second is the storage battery and the third is the system power. (2) When the voltage of the storage battery is lower than the output voltage of the AC/DC converter, the first is the DC generator, the second is the system power, and the third is the storage battery.

Therefore, no control device for controlling the DC/DC converter, the inverter and the AC/DC converter is required.

Hence, the above voltage setting enables the power generated by the DC generator to be supplied to the DC bus line with a priority higher than the system power.

Further, the above voltage setting enables the power generated by the DC generator to automatically and reversely be flown to the system power when the generated power is larger than the consumption amount by the load. Nevertheless, the power is not reversely flown from the storage battery to the system power. Besides, the AC/DC converter outputs, as necessary, so as to charge the storage battery. The storage battery can be charged depending upon the charged voltage thereof.

In an embodiment, the electric power supply system of the present invention integrates the inverter and the AC/DC converter to make a bidirectional inverter. Hereby, the number of the components of the electric power supply system can be minimized to construct the system at a lower cost.

Effect of the Invention

According to the present invention, the power generated by the DC generator can be supplied to the DC load at high efficiency.

Only when the respective converters and the inverter are independently driven, the interchange of the power among the DC generator, the system power and the load, including the storage battery if it is included, can be properly made, so that no complicated control circuit is required and a highly reliable electric power supply system can be provided at a low cost. Even when the storage battery is equipped, no complicated control circuit is required to prevent the reverse-power flow from the storage battery to the system power.

DESCRIPTION OF THE REFERENCE NUMERALS

Figure 1:
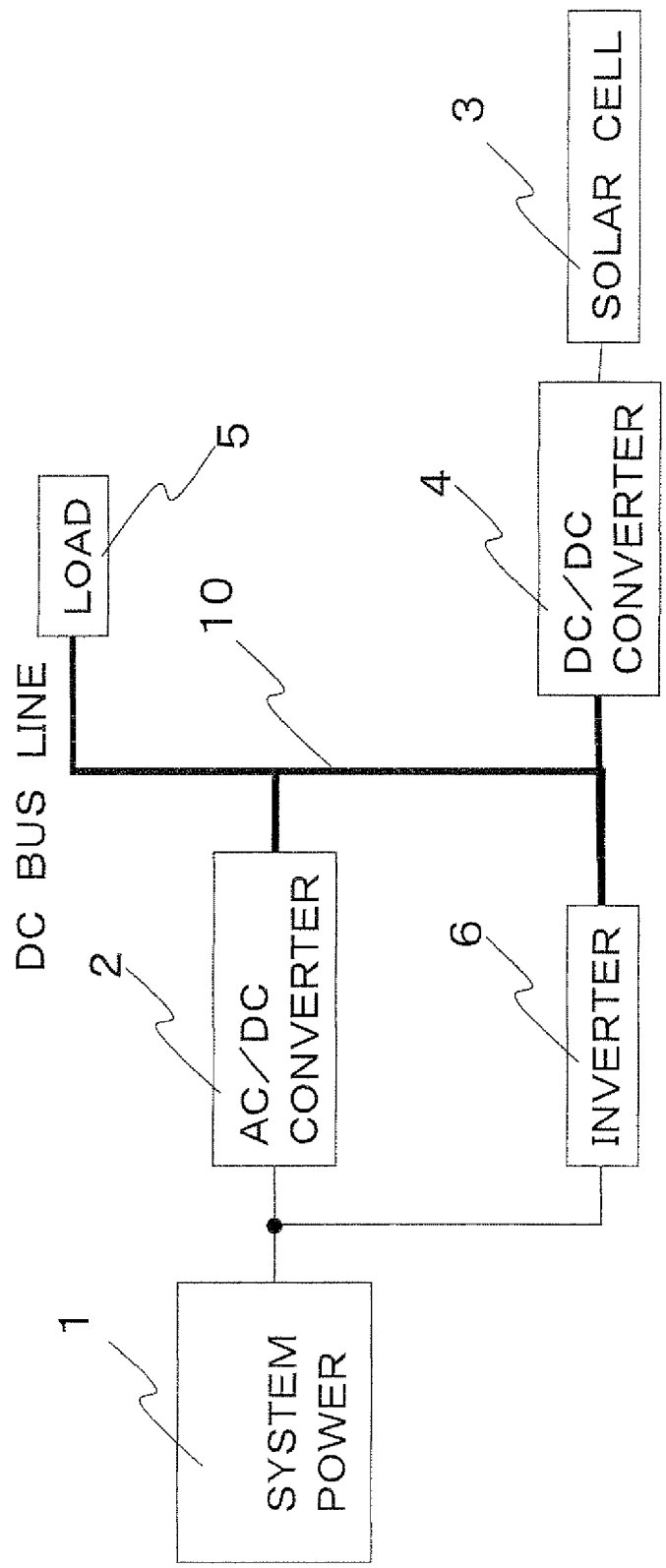
FIG. 1 is a block diagram of a system constructed as an embodiment 1 of the present invention.

1: system power
2: AC/DC converter
3: solar cell
4: DC/DC converter
5: load
6: inverter
7: bidirectional inverter
10: DC bus line
11: storage battery

BEST MODE FOR CARRYING OUT THE INVENTION

Embodiment 1

FIG. 1 is a block diagram of a system constructed as an embodiment 1 of the present invention.

System power 1 is coupled to an AC/DC converter 2, an output terminal of which is connected to a DC bus line 10. A solar cell 3 having a rated output of e.g., 1 kW is connected to the DC/DC converter 4. An output terminal of the DC/DC converter 4 is connected to the DC bus line 10. To the DC bus line 10, a load 5 and an input terminal of the inverter 6 are coupled. An output terminal of an inverter 6 is coupled to the system power 1. Among an output voltage V1 of the DC/DC converter 4, an input voltage V2 of the inverter 6 and an output voltage V3 of the AC/DC converter 2, a relationship V1>V2>V3 is set.

When the electric power supply system of the present invention is for a household use, the load 5 may be one in a house such as an illumination lamp, a television, a personal computer, a record/reproduction device, an audio equipment, an air conditioner, a washing machine, a refrigerator and a cleaner or the like. When it is for an office, the load may be an office equipment such as a photocopying machine, a personal computer, a computer, an illumination lamp and a telephone or the like. When it is for a public facility, the load may be a streetlight, a traffic signal, a sign and a guide map plate or the like. When it is for a factory, the load may be a factory machine such as a motor and a processing machine or the like.

Now, the target voltage of the AC/DC converter 2, the DC/DC converter 4 and the inverter 6, respectively, to the DC bus line 10 will be described in detail with reference to a specific voltage value thereof. These specific voltage values are exemplified only as an example, but not limited thereto.

The DC/DC converter 4 controls to output a voltage of e.g., 210 V to the DC bus line 10. Namely, when the voltage of the DC bus line 10 is lower than 210 V, the DC/DC converter 4 controls to increase the power supply amount from the solar cell 3. To the contrary, when the voltage of the DC bus line 10 is higher than 210 V, the DC/DC converter 4 controls to decrease the power supply amount from the solar cell 3. In this operation, the DC/DC converter 4 controls to keep the output voltage to the DC bus line 10 at 210 V.

The inverter 6 controls to increase an amount of power to demand from the DC bus line 10 so as to cause a reverse-power flow to the system power, when the voltage of the DC bus line 10 is higher than e.g., 200 V. When the voltage of the DC bus line 10 is lower than 200 V, the inverter 6 controls to decrease an amount of power to demand from the DC bus line 10. In this operation, the inverter 6 controls to keep the voltage of the DC bus line 10 at 200 V.

The AC/DC converter 2 controls to output a voltage of e.g., 190 V to the DC bus line 10. That is, when the voltage of the DC bus line 10 is lower than 190 V, the AC/DC inverter 2 controls to increase an amount of power to demand from the system power 1. When the voltage of the DC bus line 10 is higher than 190 V, the AC/DC inverter 2 controls to decrease an amount of power to demand from the system power 1. In this operation, the AC/DC converter 2 controls to keep the voltage of the DC bus line 10 at 190 V.

Next, the operation of the electric power supply system constructed as the embodiment 1 in the case of setting the respective voltages as above will be explained.

The electrical power generated by the solar cell 3 is assumed to be e.g., 1000 W for a sunshiny time. The electric power amount needed by the load 5 at this time is assumed to be e.g., 700 W. Since the electrical power generated by the solar cell 3 suffices the power needed by the load 5, the DC/DC converter 4 controls to supply the power of 700 W to the load 5, and, simultaneously, proceeds to control the voltage of the DC bus line 10 at 210 V. However, when the voltage of the DC bus line 10 is higher than 200 V, the inverter 6 controls to increase an amount of power to demand from the DC bus line 10 so as to cause the reverse-power flow to the system power 1.

As a result, the voltage of the DC bus line 10 becomes 200 V, in which case they are operated in such a condition that the electrical power generated by the solar cell 3 is 1000 W, the power supply amount to the load 5 is 700 W, and the amount of the reverse-power flow to the system power 1 through the inverter 6 is 300 W. Further, since the voltage of the DC bus line 10 is 200 V in this case, the AC/DC converter 2 is prevented from outputting to the DC bus line 10.

Successively, the electrical power generated by the solar cell 3 is assumed to be e.g., 500 W. Since the electric power amount of the load 5 is assumed to remain e.g., 700 W, the electrical power generated by the solar cell 3 cannot suffice the power demanded by the load 5. In such a case, the DC/DC converter 4 cannot keep the voltage of the DC bus line 10 at 200 V to lower the voltage. When the voltage of the DC bus line 10 is lower than 190 V, the power is supplied to the load 5 from the system power 1 through the AC/DC converter 2.

As a result, the voltage of the DC bus line 10 becomes 190 V, in which case they are operated in such a condition that the electrical power generated by the solar cell 3 is 500 W, the power supply amount from the system power 1 to the load 5 through the AC/DC converter is 200 W, and accordingly the load 5 consumes 700 W. Further, since the voltage of the DC bus line 10 is 190 V in this case, the reverse-power flow to the system power 1 through the inverter 6 is not caused.

Successively, the electric power amount of the load 5 is assumed to be e.g., 300 W. Since the electrical power generated by the solar cell 3 is assumed to remain 500 W, the same operation as above is performed so that the voltage of the DC bus line 10 is 200 V, the electrical power generated by the solar cell 3 is 500 W, the power supply amount to the load 5 is 300 W, and the reverse-power flow to the system power 1 through the inverter 6 is 200 W.

In this embodiment, the solar cell is exemplified as the DC generator, but any other type power source such as a wind power generator, a fuel cell, a battery or the like may be used as far as it can supply power. Further, the number of the DC generator should not be limited to one, and, for example, both of a photovoltaic generator and a wind power generator can be used.

Further, in this embodiment, the target voltage of the DC/DC converter 4, the inverter 6 and the AC/DC converter 2, respectively, to the DC bus line 10 is differentiated by 10 V, but any voltage value differentiated may be all right or each differentiated voltage value may not be the same. For example, preferably, the differentiated voltage value is 1 to 20 V.

Even if the differentiated voltage value is 1 V, the operation of the system of the present invention can be possible as far as the DC/DC converter 4, the inverter 6 and the AC/DC converter 2 can be operated within their dynamic sensitivity zones. When the differentiated voltage value is 20 V, it is set, for example, that the output voltage of the DC/DC converter 4 from the solar cell 3 is 200 V, the input voltage of the inverter 6 is 180 V, the output voltage of the AC/DC converter 2 is 160 V. Hence, when the output of the DC/DC converter 4 is supplied from the solar cell 3, the power supply to the load 5 is 200 V. Further, when the power supply is from the system power 1 through the AC/DC converter 2, the power supply to the load 5 is 160 V. Thus, the voltage received by the load 5 is varied depending upon the output variations of the solar cell 3. Therefore, if the power supply to the load 5 is excessively varied, the load 5 may become unoperatable according to the type thereof or it may be necessary that a DC/DC converter is additionally interposed at the front stage of the load 5 to stabilize the voltage thereof.

Since the load 5 may become unoperatable in the case of the large differentiated voltage value, it is necessary to set so that the load 5 is placed in an operative zone. Further, when a DC/DC converter is additionally interposed for stabilizing the voltage, efficiency may be reduced owing to the DC/DC converter, disadvantageously.

In view of the above, a voltage value of differentiating a voltage of 20 V or more, say, 50 V or 100 V is not preferable. Nevertheless, depending upon the kind of the load 5, some kind of load can be operated under the large differentiated voltage value in which case the differentiated voltage value of 20 V or more may be possible.

As described above, the differentiated voltage value should be decided to the extent that the load is placed in the operative voltage zone and that the presence of the DC/DC converter does not reduce efficiency. Further, the differentiated voltage value may be decided in view of the control capacity and the dynamic sensitivity of the AC/DC converter 2, the DC/DC converter 4 and the inverter 6. Therefore, the differentiated voltage value of 1 V or more and 20 V or less is a preferable one.

In this embodiment, the target voltage of the DC/DC converter 4 to the DC bus line 10 is set to be one voltage like 210 V, but it may be possible to set a predetermined zone such as 210 to 220 V. The target voltage of the AC/DC converter 4 and the inverter 6, respectively, to the DC bus line 10 is similar. In this case, it is prevented that each target voltage to the DC bus line 10 overlaps.

Besides, the above explanation is described assuming that a wiring resistance of the DC bus line 10 is zero, but some wiring resistance actually exists so that the differentiated voltage value should be determined in view of the voltage drop due to the wiring resistance. Further, the electric power supply system according to this embodiment can be operated when the system power 1 is cut off owing to a power failure.

Further, in this embodiment, a DC/DC converter may be placed, if necessary, at the front stage of the load 5. In such a case, the power generated by the solar cell 3 is consumed by the load 5 at the highest priority.

Next, the DC/DC converter 4, the AC/DC converter 2 and the inverter 6 will be described in detail.

Figure 2:
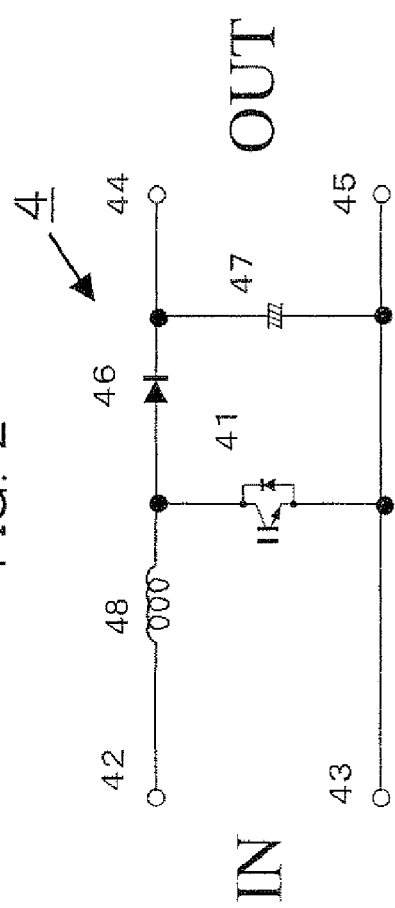
FIG. 2 is a circuit diagram of a DC/DC converter employed in the embodiment 1 of the present invention.

FIG. 2 shows the DC-DC converter 4, as a voltage conversion circuit, configured by a boost chopper circuit for boosting the output DC current from the solar cell 3 to 210 V. As shown in FIG. 2, the boost chopper circuit is a general circuit that a switching element 41 is activated in PWM (pulse Width Modulation) at about 20 kHz for boosting the DC voltage inputted across input terminals 42 and 43 to provide a high DC voltage across output terminals 44 and 45. A condenser 47 is a smooth condenser. A reactor 48 is provided. Instead of the circuit elements shown in FIG. 2, a current-resonant type isolated converter, a bidirectional chopper type DC/DC converter, a bidirectional isolated type CukDC/DC converter can be applied.

The boost chopper circuit of FIG. 2 is now described. When the switching element 41 is turned in the on state, the energy is stored in the reactor 48. When the switching element 41 is turned in the off state, the energy stored in the reactor 48 is discharged to charge the energy in an electrolytic condenser 47. The control of the proportion of time between the on and the off states by the switching element 41 enables the voltage inputted from the input terminals 42 and 43 to be boosted to a predetermined voltage (210 V in this embodiment) to output the boosted voltage from the output terminals 44 and 45. In this manner, the DC/DC converter 4 controls the output voltage thereof so as to make the output voltage of the DC/DC converter coincident with the target voltage V1.

The switching element 41 may be used by an MOS FET or IGBT (Insulated Gate Bipolar Transistor).

Figure 3:
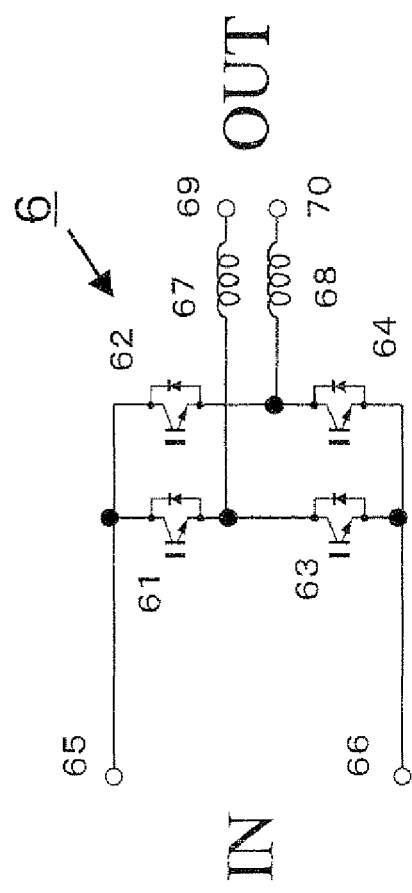
FIG. 3 is a circuit diagram of an inverter employed in the embodiment 1 of the present invention.

As shown in FIG. 3, the inverter 6 can be a full bridge circuit comprising four switching elements 61, 62, 63 and 64. These switching elements may be used by an MOS FET or IGBT, which is activated in PWM at about 20 kHz. DC power inputted across input terminals 65 and 66 is inverted into an AC voltage by the full bridge circuit and smoothed by reactors 67 and 68, to output outputted waves of almost the sine waves across output terminals 69 and 70.

When the system power is coupled to the output terminals 69 and 70 of the inverter 6, the output voltage of the inverter 6 is decided as the voltage of the system power, so that the inverter 6 is controlled to be operative when the DC voltage across the input terminals 65 and 66 is identical with the decided voltage. Namely, it is controlled as a current type inverter.

The inverter 6 is operated for inverting the DC power to the AC power by exchanging the on state and the off state per half cycle by one pair of the switching elements 61 and 64 and another pair of the switching elements 62 and 63. The switching elements 61 to 64 control the voltage across the input terminals 65 and 66 by controlling the PWM activation in response to the voltage V2 of the DC voltage applied across the input terminals 65 and 66.

Figure 4:
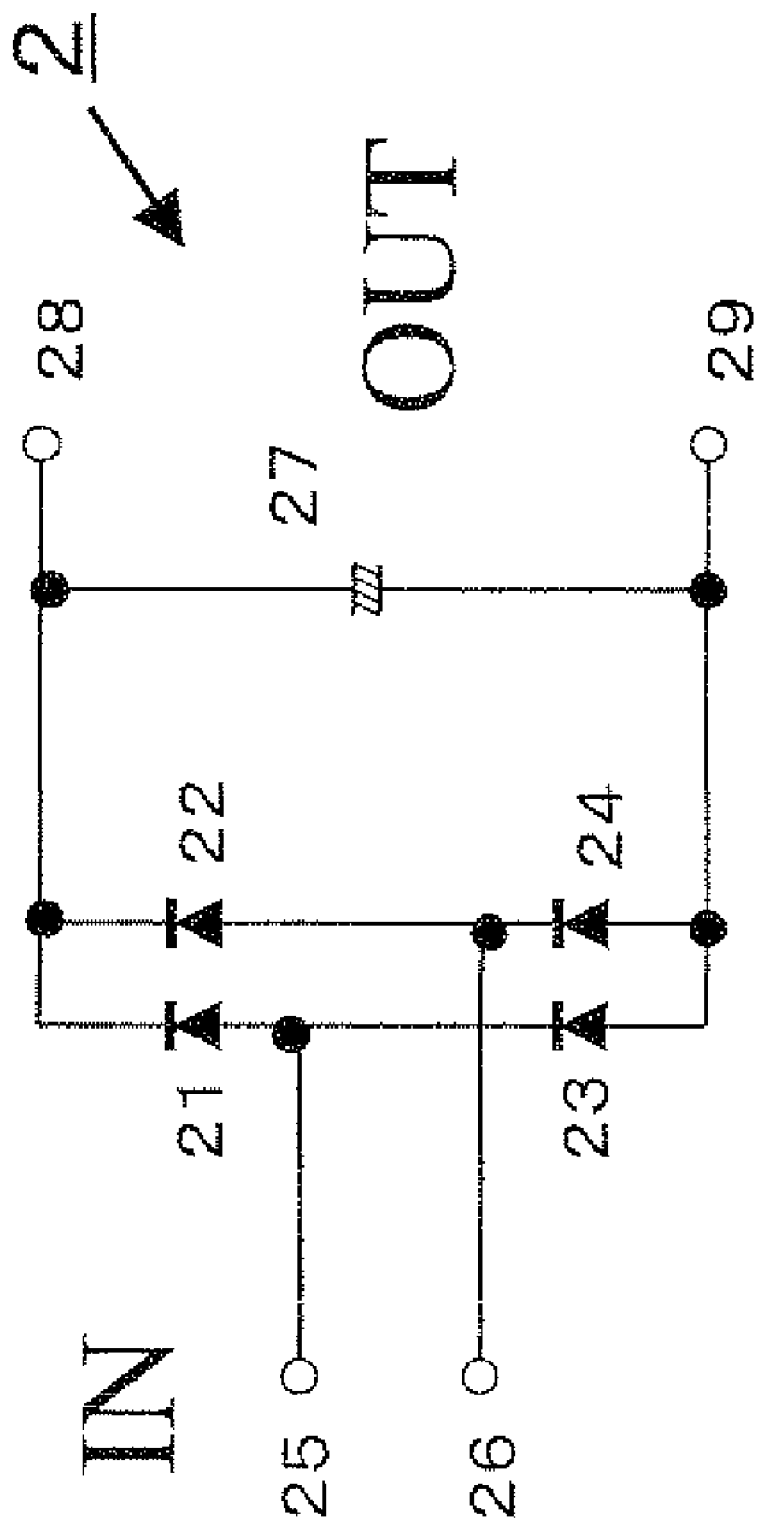
FIG. 4 is a circuit diagram of an AC/DC converter employed in the embodiment 1 of the present invention.

As shown in FIG. 4, the AC/DC converter 2 may be a diode bridge circuit comprising diode elements 21, 22, 23 and 24. AC power inputted across input terminals 25 and 26 is rectified into DC power by the diode bridge circuit and smoothed by the smooth condenser 27, to output DC power of the voltage V3 across output terminals 28 and 29.

Embodiment 2

Figure 5:
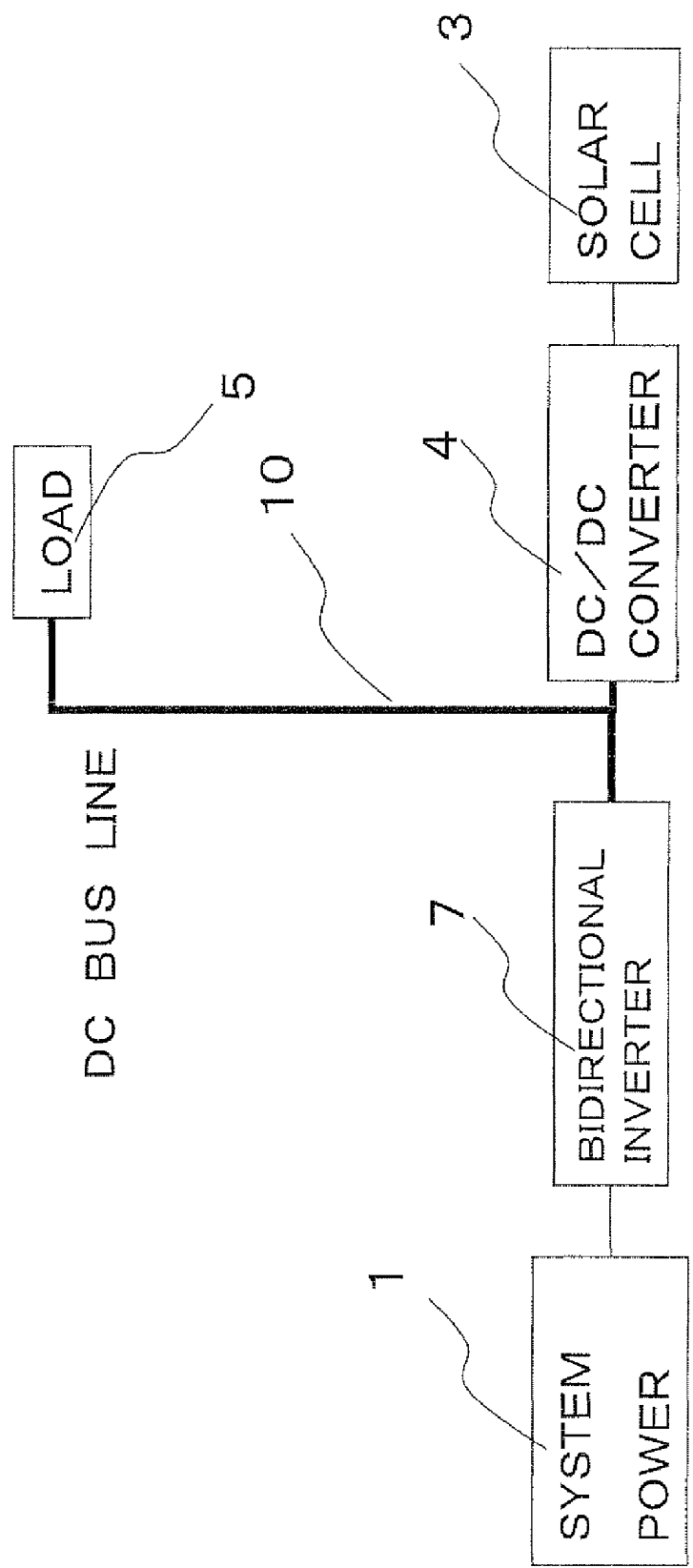
FIG. 5 is a block diagram of a system constructed as an embodiment 2 of the present invention.

FIG. 5 is a block diagram of a system constructed as an embodiment 2 of the present invention. The embodiment 2 is featured in that the inverter 6 and the AC/DC converter 2 in the embodiment 1 are integrated to make a bidirectional inverter 7 while the remaining points in the embodiment 2 are identical to the embodiment 1.

The bidirectional inverter 7 in the embodiment 2 is operated according to the functions integrated by the inverter 6 and the AC/DC converter 2 in the embodiment 1 in such a manner that when the voltage of the DC bus line 10 is 200 V, the bidirectional inverter 7 causes the reverse-power flow to the system power 1 and when the voltage of the DC bus line 10 is 190 V, the bidirectional inverter 7 permits power to be supplied from the system power 1 to the load 5. The remaining points are identical to the embodiment 1. A further explanation is omitted here.

Figure 6:
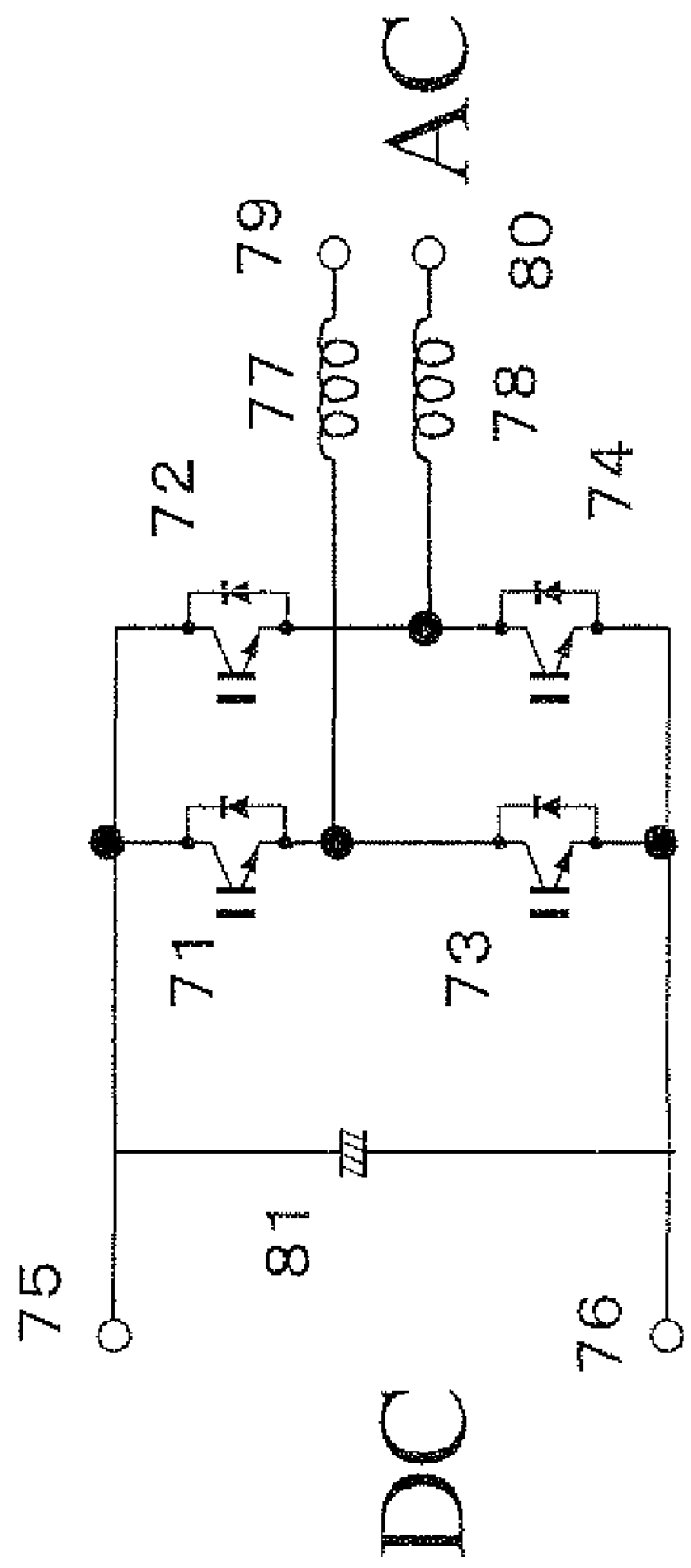
FIG. 6 is a circuit diagram of a bidirectional inverter employed in the embodiment 2 of the present invention.

FIG. 6 is a circuit diagram of the bidirectional inverter 7. The bidirectional inverter 7 is different from the inverter as shown in FIG. 2 in that a condenser 81 is connected across terminals 75 and 76 while the remaining are identical thereto.

The bidirectional inverter 7 is operated in such a manner that DC power inputted across terminals 75 and 76 is inverted into an AC voltage by the full bridge circuit and smoothed by the reactors 77 and 78 to output outputted waves of almost the sine waves across terminals 79 and 80.

The bidirectional inverter 7 is operated for inverting the DC power to the commercial AC power by exchanging the on state and the off state per half cycle by one pair of switching elements 71 and 74 and another pair of switching elements 72 and 73. The switching elements 71 to 74 invert a voltage of the commercial AC power across the output terminals by controlling pulse widths of the PWM activation in response to the voltage V2 of the DC power applied across the input terminals 75 and 76.

When AC power is inputted across terminals 79 and 80, the switching operations of the switching elements 71 to 74 are not required in which the operation similar to that of the AC/DC converter shown in FIG. 4 is performed to output DC power of a voltage V3 across the terminals 75 and 76.

Embodiment 3

Figure 7:
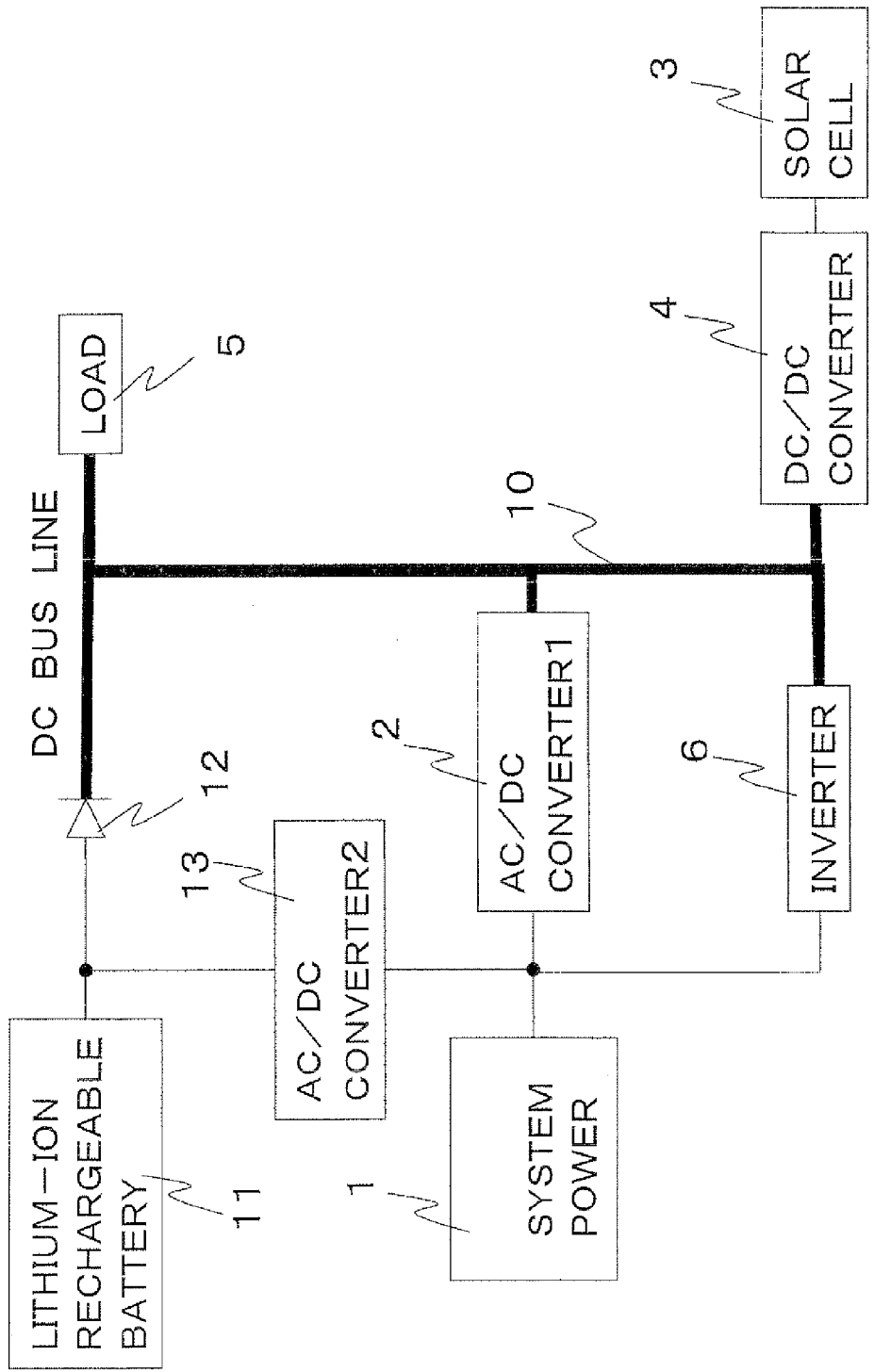
FIG. 7 is a block diagram of a system constructed as an embodiment 3 of the present invention.

FIG. 7 is a block diagram of a system constructed as an embodiment 3 of the present invention.

The embodiment 3 is differenced in that a storage battery is connected to the embodiment 1. In other words, a lithium-ion battery 11 of 1 kW is connected to the DC bus line 10 through a diode 12 and a second AC/DC converter 13 is coupled across the system power 1 and the storage battery 11. The other circuit elements are the same as those of the embodiment 1 shown in FIG. 1. In this embodiment 3, when the full charge voltage of the storage battery 11 is V4 and the empty voltage thereof is V5, the respective voltages are set as V1>V2>V4>V3>V5.

Now, in the embodiment 3, the target voltage of the AC/DC converter 2, the DC/DC converter 4 and the inverter 6, respectively, to the DC bus line will be described in detail with reference to a specific voltage value thereof. These specific voltage values are exemplified only as an example, but not limited thereto.

The DC/DC converter 4 is controlled to output a voltage of 115 V to the DC bus line 10. Namely, when the voltage of the DC bus line 10 is lower than 115 V, it controls to increase power supply from the solar cell 3, and when the voltage of the DC bus line 10 is higher than 115 V, it controls to decrease power supply from the solar cell 3. In this operation, the DC/DC converter 4 controls to keep the voltage of the DC bus line 10 at 115 V.

When the voltage of the DC bus line 10 is higher than 110 V, the inverter 6 controls to increase power supply demanded from the DC bus line 10 to cause the reverse-power flow to the system power 1. When the voltage of the DC bus line 10 is lower than 110 V, the inverter 6 controls to decrease power supply demanded from the DC bus line 10. In this operation, the inverter 6 controls to keep the voltage of the DC bus line 10 at 110 V.

The AC/DC converter 2 is controlled to output a voltage of 80 V to the DC bus line 10. Namely, when the voltage of the DC bus line 10 is lower than 80 V, the AC/DC converter 2 controls to increase power supply from the system power 1. When the voltage of the DC bus line 10 is higher than 80 V, the AC/DC converter 2 controls to decrease power supply from the system power 1. In this operation, the AC/DC converter 2 controls to keep the voltage of the DC bus line 10 at 80 V.

Next, the full charge voltage V4 and the empty voltage V5 of the lithium-ion rechargeable battery 11 and the possible influence thereof to the DC bus line 10 will be explained. In the electric power supply system of the embodiment 3, 25 lithium-ion rechargeable batteries are connected in series, in which the full charge voltage of a single one is 4.2 V and the empty voltage thereof is 3 V, so that the total of the full charge voltages is 105 V and the total of the empty voltages is 75 V.

Further, the output voltage of the second AC/DC converter 13 is always governed by the voltage of the lithium-ion rechargeable battery 11. Since the lithium-ion rechargeable battery 11 is coupled to the DC bus line 10 through a blocking diode 12, the voltage of the lithium-ion rechargeable battery 11 is lower than the voltage of the DC bus line 10 to provide no influence in the case where the power amount generated by the solar cell 3 is large and the voltage of the DC bus line 10 is higher than 110 V. When the power amount generated by the solar cell 3 is small, the voltage of the lithium-ion rechargeable battery 11 may be possibly equal to the voltage of the DC bus line 10.

The operation of the second AC/DC converter 13 will be explained. The second AC/DC converter 13 is operated only during the time of the nighttime power of the commercial system power set by the electric power company. Upon the time of the nighttime power, the second AC/DC converter 13 starts to charge the lithium-ion rechargeable battery 11. Once the charging is completed, the second AC/DC converter 13 stops operating and does not operate until the next time of the nighttime power. Thus, the operation of the second AC/DC converter 13 is thus timed.

Next, the operation of the embodiment 3 in case of setting the voltages as above will be explained.

The voltage of the electrical power generated by the solar cell 3 is assumed to be 1000 W in a morning on a sunshiny day. The full charge voltage of the lithium-ion rechargeable battery 11 at this time is assumed to be 105 V and the power needed by the load 5 is assumed to be 700 W. Since the electrical power generated by the solar cell 3 suffices the power needed by the load 5, the DC/DC converter 4 controls to supply the power of 700 W to the load 5, and, simultaneously, proceeds to control the voltage of the DC bus line 10 at 115 V. However, when the voltage of the DC bus line 10 is higher than 110 V, the inverter 6 controls to increase an amount of power to demand from the DC bus line 10 so as to cause reverse-power flow to the system power 1.

As a result, the voltage of the DC bus line 10 becomes 110 V, in which case they are operated in such a condition that the electrical power generated by the solar cell 3 is 1000 W, the supply power amount to the load 5 is 700 W, and the amount of the reverse-power flow to the system power 1 through the inverter 6 is 300 W. Further, since the voltage of the DC bus line 10 is 110 V in this case, the AC/DC converter 2 is prevented from outputting to the DC bus line 10. Similarly, the voltage of the lithium-ion rechargeable battery 11 is 105 V, so that it is prevented from outputting to the DC bus line.

Successively, when the sun goes down, the electrical power generated by the solar cell 3 is assumed to be 500 W. Since the electric power amount of the load 5 is assumed to remain 700 W, the electrical power generated by the solar cell 3 cannot suffice the power demanded by the load 5. In such a case, the voltage of the DC bus line 10 cannot be kept at 110 V so as to reduce the voltage. When the voltage of the DC bus line 10 is lower than 105 V, the power is supplied to the load 5 from the lithium-ion rechargeable battery 11.

As a result, the voltage of the DC bus line 10 becomes 105 V, in which case they are operated in such a condition that the electrical power generated by the solar cell 3 is 500 W, the supply power amount from the lithium-ion rechargeable battery 11 to the load 5 is 200 W, and accordingly the load 5 can be operated at 700 W. Of course, when supplying power, the voltage of the lithium-ion rechargeable battery 11 is lowered so that the voltage of the DC bus line 10 is gradually lowered. Further, since the voltage of the DC bus line 10 is 105 V or less in this case, the reverse-power flow to the system power 1 through the inverter 6 is not caused. Further, since the output voltage of the AC/DC converter 2 is 80 V, the system power 1 does not supply power until the voltage of the lithium-ion rechargeable battery 11 is discharged down to 80 V.

Thereafter, the above conditions are continued, so that the voltage of the lithium-ion rechargeable battery 11 is lowered less than 80 V. Then, power of 200 W is supplied from the system power 1 to the load 5 through the AC/DC converter 2.

Successively, when it is sunshiny again, the electrical power generated by the solar cell 3 is assumed to be 1000 W. Since the electric power amount of the load 5 is assumed to remain 700 W, the electrical power generated by the solar cell 3 suffices the power needed by the load 5, again. Thus, as mentioned above, the voltage of the DC bus line 10 is 110 V so that the reverse-power flow to the system power 1 through the inverter 6 is 300 V.

Thereafter, in the night, the electrical power generated by the solar cell 3 becomes 0 W, but the power needed by the load 5 is increased to 1000 W. In such a case, the voltage of the lithium-ion rechargeable battery 11 is 80 V or less so that power of 1000 W is supplied from the system power 1 to the load 5 through the AC/DC inverter 2, whereby the voltage of the DC bus line 10 is 80 V.

Thereafter, upon the time of the nighttime power of the commercial system power set by the electric power company, the second AC/DC converter 13 starts to activate. At this time, while the system power 1 charges the lithium-ion rechargeable battery 11 through the second AC/DC converter 13, the system power 1 supplies power to the load 5. While the voltage of the lithium-ion rechargeable battery 11 is less than 80 V, the power supply from the system power 1 to the load 5 is performed through the AC/DC converter 2 and when the voltage of the lithium-ion rechargeable battery 11 is 80 V or more, the power supply from the system power 1 to the load 5 is performed through the second AC/DC converter 13. While the voltage of the lithium-ion rechargeable battery 11 is less than 80 V, the DC bus line 10 is kept at 80 V and when the voltage of the lithium-ion rechargeable battery 11 is 80 V or more, the voltage of the lithium-ion rechargeable battery 11 equals to the voltage of the DC bus line 10. When the voltage of the lithium-ion rechargeable battery 11 reaches a full charge voltage (105 V), the charge from the system power 1 to the lithium-ion rechargeable battery 11 ends, but for the time of the nighttime power, the power supply is performed from the system power 1 to the load 5, which needs the power of 1000 W, through the second AC/DC converter 13. After the end of the time of the nighttime power, the similar operation is repeated from the morning, again.

Also in the embodiment 3, the solar cell 3 is exemplified as the DC generator, but any other type power source such as a wind power generator, a fuel cell, a battery or the like may be used as far as it can supply power. Further, the number of the DC generator should not be limited to one, but, two or more may be possible.

Further, the target voltage of the DC/DC converter 4, the inverter 6, and the AC/DC converter 2, respectively, to the DC bus line 10 and the full charge voltage and the empty voltage of the lithium-ion rechargeable battery 11 may be differentiated 1 to 20 V as explained in the embodiment 1, and, depending upon the kind of the load 5, they may be more than 20 V.

The target voltage of the DC/DC converter 4, the inverter 6 and the AC/DC converter 2, respectively, to the DC bus line 10 may be within a predetermined voltage zone as explained in the embodiment 1. In this case, it is prevented that each target voltage to the DC bus line 10 overlaps.

Further, it may be possible that a DC/DC converter is additionally interposed at the front stage of the load 5 if necessary. In such a case, the power generated by the solar cell 3 is consumed by the load 5 with the highest priority.

Further, the second AC/DC converter 13 is not needed to continue to operate during the time of the nighttime power and it may stop after the lithium-ion rechargeable battery 11 is fully charged. The second AC/DC converter 13 can operate to charge the lithium-ion rechargeable battery 11 for not only the time of the nighttime power, but also the time when it is advantageous for the user including the time when the power is cheap or so. Further, when the power system is abnormal, the second AC/DC converter 13 may be operated so that the power generated by the solar cell 3 is charged through the inverter.

In this embodiment, the diode 12 is employed as the switching element, but a FET, IGBT or the like can be employed to block a current from the load 5 to the lithium-ion rechargeable battery 11.

The circuits of the DC/DC converter 4, the inverter 6 and the AC/DC converter 2 used for the embodiment 3 are the same as those shown in FIGS. 2 to 4 in the embodiment 1.

Embodiment 4

Figure 8:
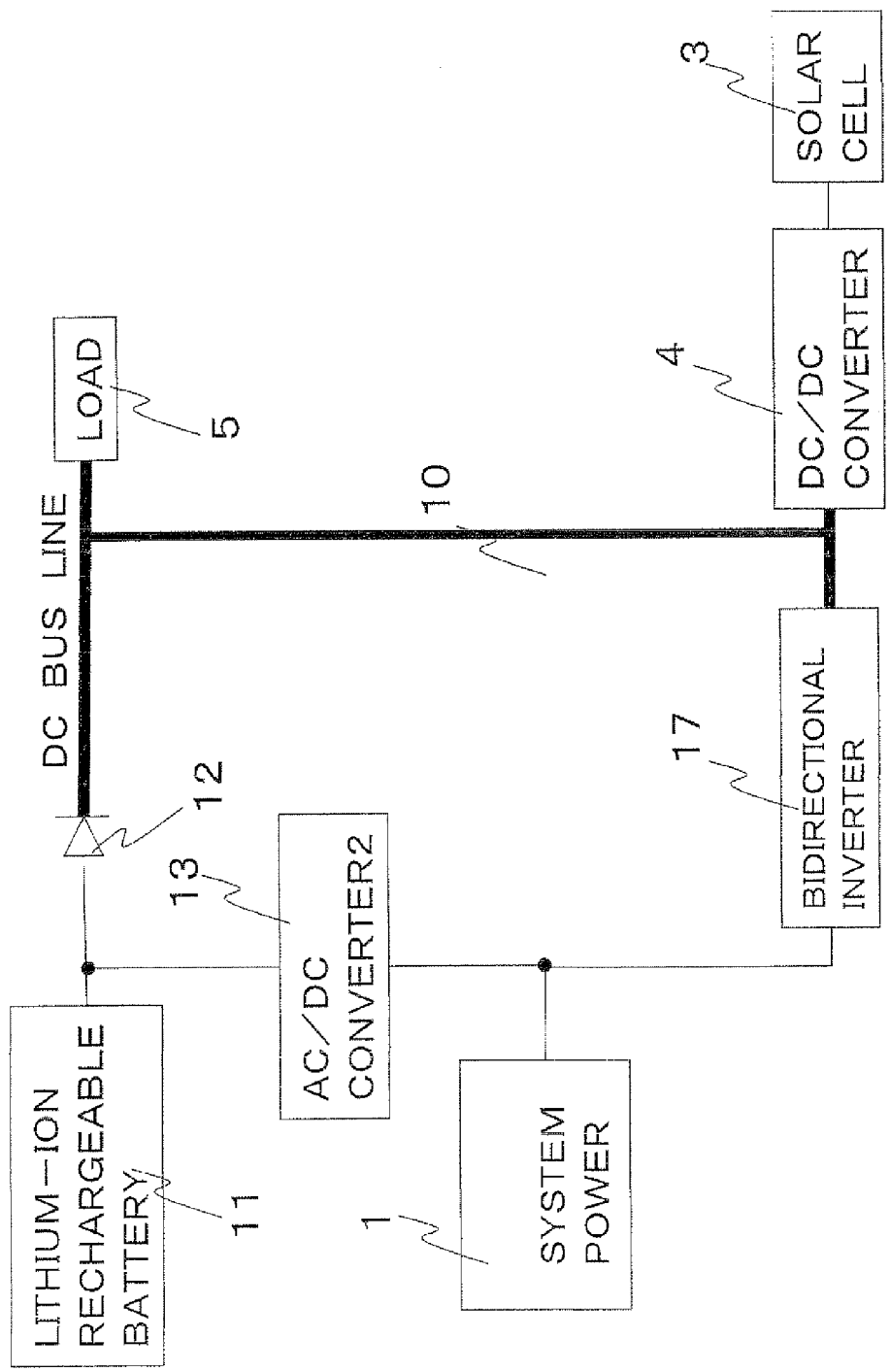
FIG. 8 is a block diagram of a system constructed as an embodiment 4 of the present invention.

FIG. 8 is a block diagram of a system constructed as an embodiment 4 of the present invention.

The embodiment 4 is featured in that the inverter 6 and the AC/DC converter 2 are integrated to make a bidirectional inverter 17 while the remaining points in the embodiment 4 are identical to the embodiment 3.

The embodiment 4 is operated according to the functions integrated by the inverter 6 and the AC/DC converter 2 in the embodiment 3 in such a manner that when the voltage of the DC bus line 10 is 110 V, the bidirectional inverter 17 causes the reverse-power flow to the system power 1 and when the voltage of the DC bus line 10 is 80 V, the bidirectional inverter 17 permits power to be supplied from the system power 1 to the load 5. The remaining points are identical to those in the embodiment 3.

The circuit of the bidirectional inverter 17 is the same as that shown in FIG. 6 in the embodiment 2.

The invention claimed is:

1. An electric power supply system comprising:
   a DC bus line for connecting a DC generator, a load and system power with each other;
   a DC/DC converter connected between the DC generator and the DC bus line for controlling an output voltage to the DC bus line at a voltage $V1$;
   an inverter connected between the system power and the DC bus line for outing a voltage $V2$ from the DC bus line;
   an AC/DC converter connected between the system power and the DC bus line, for output voltage $V3$ for output voltage $V3$ to the DC bus line; and
   a storage battery connected to the DC bus line
   wherein when a full charge voltage of the storage battery is $V4$ and an empty voltage of the storage battery is $V5$, the respective voltages are set as $V1>V2>V4>V3>V5$, and an order in which power is to be supplied to the DC bus line is automatically decided such that when a voltage of the storage battery is higher than an output voltage of the AC/DC converter, first is the DC generator, second is the storage battery and third is the system power, and when the voltage of the storage battery is lower than the output voltage of the AC/DC converter, first is the DC generator, second is the system power, and third is the storage battery.

2. The electric power supply system according to claim 1, wherein when the output voltage of the DC/DC converter is lower than the voltage $V1$, the DC/DC converter operates to increase an output thereof and when the output voltage of the DC/DC converter is higher than the voltage $V1$, the DC/DC converter operates to decrease the output thereof.

3. The electric power, supply system according to claim 1, wherein when the input voltage of the inverter is higher than the voltage $V2$, the inverter operates to increase an output thereof and when the input voltage of the inverter is lower than the voltage $V2$, the inverter operates to decrease the output thereof.

4. The electric power supply system according to claim 1, wherein the inverter and the AC/DC converter comprise a bidirectional inverter.

5. The electric power supply system according to claim 1, wherein the load is an illumination lamp, a television, a personal computer, a record/reproduction device, an audio equipment, an air conditioner, a washing machine, a refrigerator, a cleaner, a streetlight, an office equipment, a factory machine or the like.

* * * * *